United States Patent
Bergqvist et al.

(10) Patent No.: US 6,363,795 B1
(45) Date of Patent: Apr. 2, 2002

(54) SYSTEM AND METHOD FOR GENERATING SIGNAL CHANGES WHEN DETERMINING AN AMOUNT OF FUEL DISPENSED FROM A FUEL PUMP UNIT

(75) Inventors: Anders Bergqvist, Malmö; Bengt I. Larsson, Skivarp; Fredrik Lundby, Malmö, all of (SE)

(73) Assignee: Dresser Wayne AB, Malmo (SE)

( * ) Notice: Subject to any disclaimer, the term of this patent is extended or adjusted under 35 U.S.C. 154(b) by 0 days.

(21) Appl. No.: 09/428,365

(22) Filed: Oct. 28, 1999

Related U.S. Application Data

(63) Continuation of application No. PCT/SE98/00784, filed on Apr. 29, 1998.

(30) Foreign Application Priority Data

Apr. 30, 1997 (SE) ................................................ 9701648

(51) Int. Cl.$^7$ ........................... G01F 15/00; G01B 7/00; G01P 3/36
(52) U.S. Cl. ............... 73/861.77; 324/174; 324/207.12; 324/207.22
(58) Field of Search ........................ 73/861.77, 861.78, 73/861.88, 811.94; 324/207.2, 207.21, 207.22, 207.25, 174, 175, 163, 165, 207.12, 207.13, 207.11

(56) References Cited

U.S. PATENT DOCUMENTS

| | | | | |
|---|---|---|---|---|
| 3,636,767 A | * | 1/1972 | Duffy | ...................... 73/861.77 |
| 3,742,243 A | * | 6/1973 | Gamble | ...................... 324/174 |
| 4,109,526 A | * | 8/1978 | Rosso | ...................... 73/861.78 |
| 4,253,341 A | | 3/1981 | Ikeda et al. | ............... 73/861.77 |
| 4,537,081 A | * | 8/1985 | Max | ........................ 73/861.77 |
| 4,829,248 A | * | 5/1989 | Loubier | ................. 324/207.12 |
| 5,160,886 A | | 11/1992 | Carlen | .................... 324/207.16 |
| 5,327,789 A | * | 7/1994 | Nijdam | ..................... 73/861.56 |
| 5,965,825 A | * | 10/1999 | Nitecki | ..................... 73/861.77 |

FOREIGN PATENT DOCUMENTS

| | | |
|---|---|---|
| EP | 0 329 040 | 2/1989 |
| FR | 2736428 | * 1/1997 |
| GB | 2 257 522 A | 1/1993 |
| WO | WO 88/08518 | 11/1988 |

\* cited by examiner

*Primary Examiner*—Benjamin R. Fuller
*Assistant Examiner*—Jagdish Patel

(57) ABSTRACT

A system including a pulse-generating device can comprise of at least one analog sensor and at least one unit for signal-processing is arranged to detect the analog signal and to generate signal changes having a higher frequency. When generating signal changes in connection with the determination of the amount of fuel dispensed from a fuel pump unit and a frequency generator for generating a periodic analog signal having a frequency is generated, which corresponds to a fuel volume flow in the pump unit. The amplitude of the analog signal is detected and then signal changes having a higher frequency are emitted, which is dependent on and higher than the frequency.

13 Claims, 2 Drawing Sheets

SYSTEM AND METHOD FOR GENERATING SIGNAL CHANGES WHEN DETERMINING AN AMOUNT OF FUEL DISPENSED FROM A FUEL PUMP UNIT

This application is a Cont of PCT/SE98/00784 filed Apr. 29, 1998.

FIELD OF THE INVENTION

The present invention relates to a method and an apparatus for generating digital signal changes when determining the amount of fuel dispensed from a fuel pump unit in accordance with the preamble to claims 1 and 8.

BACKGROUND ART

When measuring the volume of fuel dispensed from a fuel pump unit, it is common to let the fuel flow through a measuring means, in which the fluid flow, via movable pistons in a measuring chamber in the measuring means, causes a rotational movement. The rotational movement is then converted by a pulse-generating device, which emits electric pulses of a frequency which is proportional to the speed of the rotational movement. By means of these pulses, a calculating unit then controls a counter to indicate the volume dispensed.

An example of an apparatus of this kind for measuring the volume of a flowing fluid is disclosed in Applicant's WO 88/08518. In this apparatus the movable pistons in the measuring chamber are connected to a rotatable shaft assembly. When the fluid flows through the measuring chamber, the pistons are caused to move and the shaft assembly is rotated. To the shaft assembly there is connected a frequency generator in the form of an apertured disc, which is adapted to rotate with the shaft assembly. A pulse-generating device is adapted to sense, in a contactless manner, the movement of the frequency generator and convert it into pulses via an optical transmitter and an optical receiver, which during rotation of the disc cooperate with the apertures in the disc. By means of this apparatus, pulses are generated, the number of which corresponds to the volume that has passed through the measuring chamber. the pulse-generating device, in turn, is connected to a calculating unit for calculating the volume that has flown through the measuring chamber depending on the of pulses emitted by the pulse generator. To the calculating unit there is, in turn, connected a counter for indicating the dispensed volume.

A general wish for high accuracy when determining an amount of fuel dispensed from a fuel pump unit is that a high resolution of the measured signals is desired, i.e. one wants to have a large number of pulses for each unit of fuel volume. An increased resolution of signals from the frequency generator implies, however, that higher demands are placed on both the transmission and reception of frequency signals. For instance, when using an optical transmitter and receiver in cooperation with an apertured rotating disc according to WO 88/08518, higher and higher demands are placed on the transmitter and the receiver, the more and smaller apertures that are formed in the disc The requirement for high resolution is in opposition to the need for clear and reliable signal detection and wishes for small dimensions and simple constructions.

The use of optical transmitters and optical receivers has the drawback that the components are relatively energy-intensive, which places high demands on the equipment being explosion-proof.

A further drawback of the construction according to WO 88/08518 is the demand for an opening for the shaft of the frequency generator (disc) since high demands are placed on shaft seals in pumps for vehicle fuels.

SUMMARY OF THE INVENTION

Based on that stated above, the object of the present invention is to improve the prior-art technique for determining the amount of fuel dispensed from a fuel pump unit.

A special object of the invention is to permit a high signal resolution at the same time as the possibilities of clear and reliable signal detection are improved. In this context, it is also desirable to permit the use of components of small dimensions.

According to the invention, these and other objects that will appear from the following description have now been achieved by means of a method and an apparatus which are of the types described by way of introduction and which besides have the features stated in the characterising clauses of claims 1 and 8.

The inventive method thus generates a periodic analog signal having a first frequency corresponding to a fuel volume flow in the pump unit. The amplitude of the analog signal is detected. Based on the amplitude of the analog signal, signal changes are effected, having a second frequency which is dependent on and higher than the first frequency.

In the generation of the signal changes the amplitude of the analog signal is compared with a number of predetermined amplitude values, and a signal change is effected when a predetermined amplitude value has been reached.

As a result, the frequency of the analog signal can be held comparatively low. This results in good detectability since the number of periodic signal changes that must be accommodated, formed on or emitted by the frequency generator can be kept low. The signals can also be given a comparatively grater amplitude, which results in improved detectability. Lower demands can thus be placed on the equipment required for detection of the signal.

By a second higher frequency, which depends on the first frequency, being generated based on the amplitude of the analog signal, a high resolution is obtained for good accuracy when determining amounts of fuel.

In this way, it has been possible to satisfy the two opposed desiderata, simple detectability and high resolution, at the same time.

By periodic analog signal is meant a signal whose amplitude varies periodically. It is preferred for the analog signal to be continuous and have no sharp amplitude changes. Suitable analog signals are sinus signals.

The signal changes may consist of pulses or pulse edges. Besides the signal changes can be distributed on one or more signals and are preferably digital.

According to one aspect of the invention, one detects a plurality of amplitude values during each period of the analog signal.

A great advantage of the invention is that reliable and contactless detection of an analog signal can be carried out also under difficult conditions for signal transmission. For instance, one embodiment of the invention, in which the analog signal comprises magnetic field changes, is extremely well suited for contactless detection of the analog field through a liquid-tight measuring chamber without lead-ins, such as for shafts.

In a preferred embodiment of the invention, the amplitude of the analog signal is detected simultaneously in a first and second phase angle position, which are phase-shifted relative to each other. On the one hand, this results in the obtaining of information about the direction in which the signal is transmitted; in the case of a rotary frequency generator, information on the direction of rotation is thus obtained. Moreover, it is possible to use the possibility of detecting the analog signal in the angle position where the amplitude measurement gives the clearest reading of a correct frequency position, i.e. where the absolute derivative of the amplitude is at its maximum. Thus, improved detectability and improved reliability are achieved. It is particularly advantageous to carry out measurements in two phase angle positions which are relatively displaced by a quarter of a period (90°) since the absolute derivative of the signal in the one phase angle position has high values when the absolute derivative of the signal in the other phase angle position has low values and vice versa.

It is particularly preferable that the frequency for the signal changes is proportional to the frequency of the analog signal.

The apparatus according to the invention comprises a frequency generator, which is adapted to generate a periodic analog signal, preferably a sinus signal. In a preferred embodiment of the inventive apparatus, the frequency generator comprises a frequency disc, in whose circumference magnets are arranged. Besides, it is preferable that the frequency generator is arranged in the measuring chamber of the pump unit or on the fuel side of a fluid-tight barrier, such as the wall of a measuring chamber, and that the signal emitted by the frequency generator is detectable in the contactless manner outside the measuring chamber or on the other side of the fluid-tight barrier.

The signal of the frequency generator is detected by a pulse-generating device. The pulse-generating device comprises at least one sensor, which has the capacity of detecting amplitude changes in the analog signal. These amplitude changes are used by a signal-processing unit for generating preferably digital signal changes, which have a higher frequency than the analog signal.

In a preferred embodiment, the pulse-generating device comprises at least one analog sensor, which is adapted to supply a voltage that varies in response to magnetic field variations.

BRIEF DESCRIPTION OF THE DRAWINGS

The invention will now be described in more detail with reference to the accompanying drawings, which for the purpose of exemplification illustrate a currently preferred embodiment, and in which.

DESCRIPTION OF THE PREFERRED EMBODIMENT OF THE INVENTION

Figure 1:
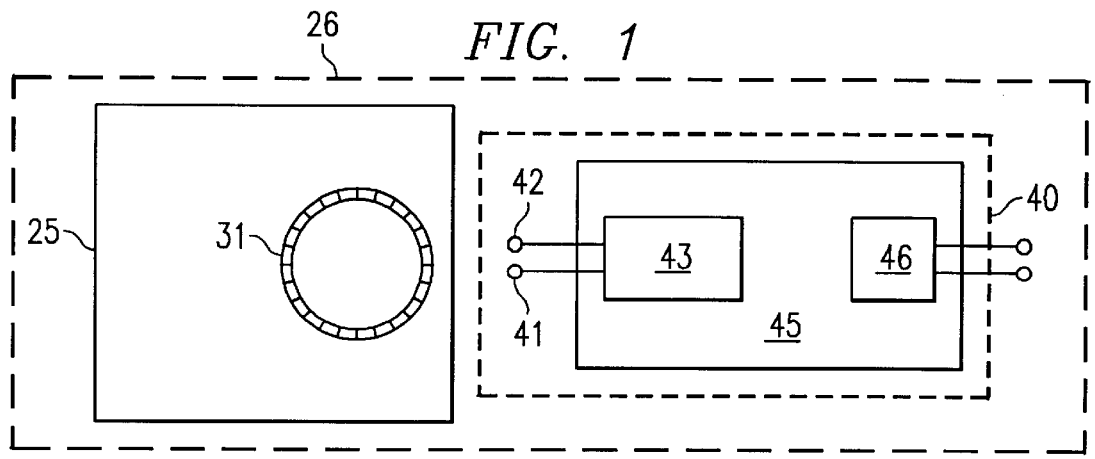
FIG. 1 is a block diagram of a device according to the invention in a fuel pump unit.

FIG. 1 is a block diagram of a preferred embodiment of the invention. A measuring chamber 25 in a pump unit 26 for vehicle fuel comprises a piston-and-shaft assembly (not shown) for converting volume flow to a rotational movement. A frequency generator in the form of a frequency disc 31 is connected to the shaft assembly. The disc 31 is enclosed in the measuring chamber and has along its circumference a number of successively arranged magnets. In the embodiment, 13 magnets are arranged along the circumference of the disc.

A pulse-generating device 40 (indicated by dashed lines), which is also mounted in the fuel pump unit, comprises two analog magnetic field sensors 41, 42, for instance Hall effect sensors, and a signal-processing unit 45. The two magnetic field sensors 41, 42 are arranged adjacent to the wall of the measuring chamber in the vicinity of the frequency disc 31. During rotation of the frequency disc 31, the two magnetic field sensors 41, 42 will convert that magnetic field which each of the sensors senses into corresponding electric voltage variations. The two magnetic field sensors 41, 42 are connected to a signal-processing unit 45, which has functions for A/D conversion for transmitting digital signal changes in the form of output pulses to a counter and/or a pump computer.

The signal-processing unit can advantageously be a processor, which on the one hand has the abovementioned functions and, on the other hand, has intelligence of its own for e.g. calibration, signal adaptation and further signal processing. The signal-processing unit, however, may in a simpler version have no intelligence of its own and comprise a separate unit 43 (shown in FIG. 2) for A/D conversion (analog-to-digital signal conversion) and a pulse generator 46.

Figure 2:
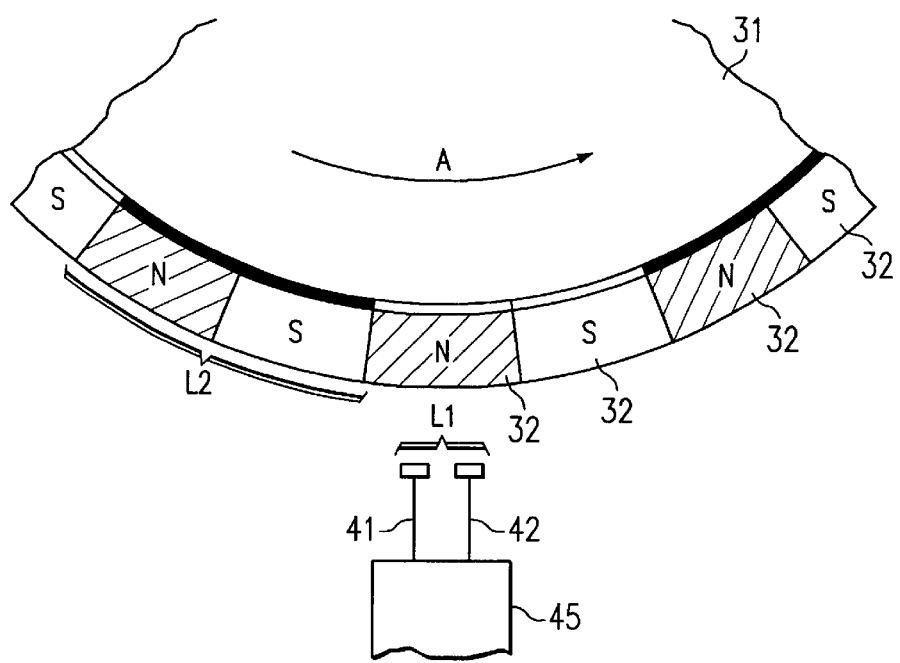
FIG. 2 is a schematic view of a frequency generator and two sensors for detecting of signal amplitude.

FIG. 2 is a schematic view of the frequency disc 31 and a number of magnets 32, which constitute 13 pairs of poles (N,S) along the circumference of the frequency disc 31. In FIG. 2, the wall of the measuring chambers has been omitted for better clarity. Each of the magnets has a north pole (N) and a south pole (S) and has an extension L2 in the circumferential direction. The frequency disc is adapted to rotate in a direction of rotation A when dispensing fuel from the fuel pump unit.

The two magnetic field sensors 41, 42 are arranged at a distance from the frequency disc and at a relative distance L1. This relative distance L1 results in the two magnetic field sensors detecting the magnetic field changes emitted by the frequency disc with a relative phase shift. Preferably, the distance L1 is a quarter of the distance L2, which results in a relative phase shift of 90° between the two magnetic field sensors.

Figure 3:
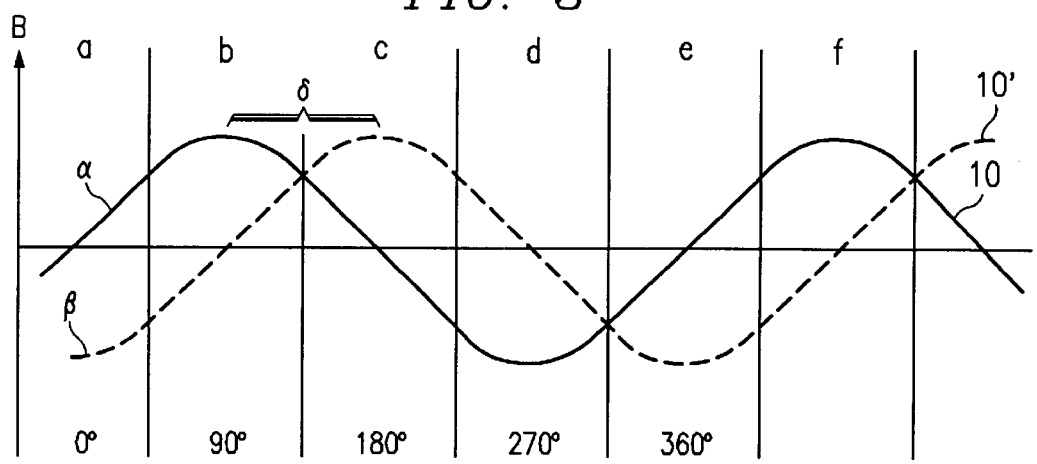
FIG. 3 is a diagram of an analog signal in the form of a varying magnetic field.

The diagram in FIG. 3 shows a periodic signal 10 in the form of a sinusoidal varying magnetic field in relation to amplitude B. The signal 10 corresponds to that magnetic field which is detected by the magnetic field sensor 41. Dashes also indicate the analog signal 10' from the magnetic field changes in the second magnetic field sensor 42. As is evident from the diagram, the two signals are phase-shifted relative to each other. The phase angle position a of the signal 10 and the phase angle position β of the signal 10' differ in each point of time by the phase shift δ. In this case, δ is 90° according to the distance conditions in FIG. 2.

FIG. 3 further illustrates different periods a-f, in which the two signals 10, 10', depending on the phase shift, have different derivative values. In the period a, the signal 10 has a high absolute value of derivative while at the same time the signal 10' has a low absolute value of derivative that varies around 0. In the next period b, the conditions are reversed. The signal 10 has a low absolute derivative value, and the signal 10' has a high absolute derivative value. Correspondingly, the derivative value is alternatingly high and low for the two signals 10, 10' in the subsequent periods c–f. Each of the periods comprises 90°.

Figure 4:
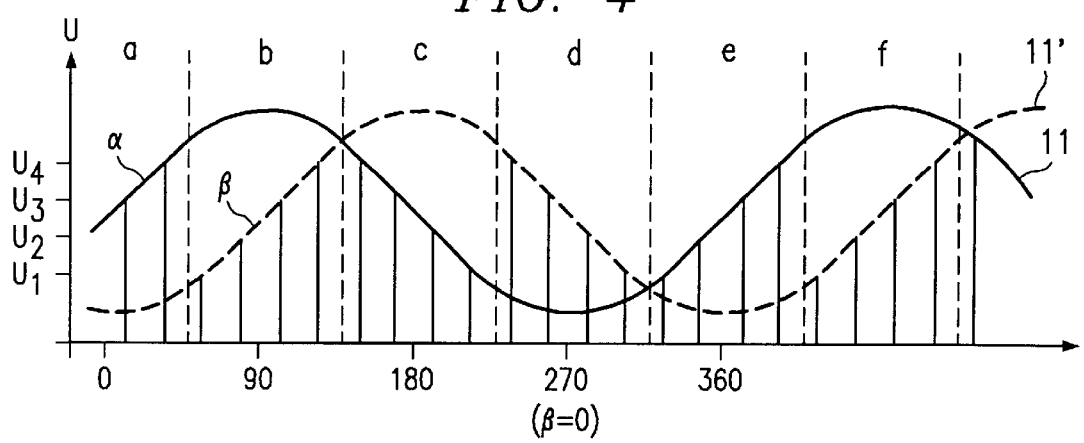
FIG. 4 is a diagram illustrating variations in voltage in response to magnetic field variations according to FIG. 3.

FIG. 4 shows in the same manner as in FIG. 3 the two signals 11 and 11' obtained from the magnetic field sensors 41, 42 when detecting the two magnetic field signals 10, 10'. The signal-processing unit 45 detects the amplitudes (U) of the two voltage signals 11, 11', for instance, by means of a unit for A/D conversion 43. When reaching predetermined amplitudes $U_1$–$U_4$, a signal change is initiated for one or more output signals from the signal-processing unit 45. As is evident, an initiation is effected in the period a, c and e by predetermined values of the first signal 11 being detected. In the periods d, e and f, the same initiation is effected by predetermined values of the second signal 11' being detected. Thus, a digital signal change is initiated each time one of the predetermined amplitude values $U_{1-U4}$ is detected by one of the sensors 41, 42. The signal-processing unit can either be controlled, during each period, to merely detect the signal amplitude from a sensor measuring a signal which during the respective periods has a high absolute derivative. Alternatively, detection can be carried out all the time since the two signals can have the same amplitude in transitional positions only. The predetermined amplitude values $U_{1-U4}$ are selected such that a substantially uniform angular pitch is obtained between the times when a predetermined amplitude value is detected.

Figure 5A:
FIGS. 5a and 5b show two examples of two digital signal changes in response to the variations in the magnetic field and voltage according to FIGS. 3 and 4.
Figure 5B:
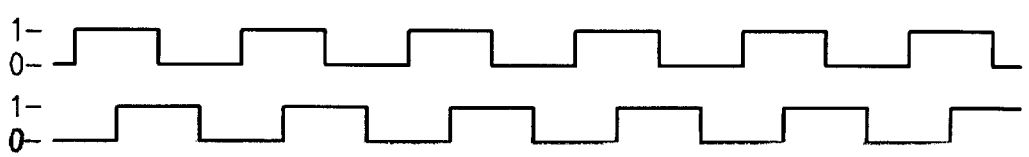

FIG. 5a shows an output signal (in relation to a high 1 and a low 0) from the signal-processing unit 45 in response to detection of the predetermined amplitude values stated in FIG. 4. As is evident, a signal change or edge is produced each time a predetermined value is detected. The predetermined values can also be regarded as edge trigger levels in the unit for A/D conversion. By the two signals being phase-shifted relative to each other in a range of 0–180°, it is possible, either by analysis of the two signals or by analysis of edge trigger values, to determine in which direction the frequency generator rotates. FIG. 5b illustrates an alternative to the output signal according to FIG. 5a. In FIG. 5b two relatively phase-shifted output signals (in relation to a high 1 and a low 0) are emitted from the signal-processing unit 45 to a subsequent counter with an associated processor. By sending two pulse trains, the processor of the counter can determine the direction of rotation by an analysis of the frequency succession of the pulse trains. Each of the two pulse trains in FIG. 5b has a frequency which is half of that of the pulse train according to FIG. 5a, but together they have the same number of edge shifts or the same high frequency of edge shifts, which results in the same good resolution in the counter.

A great advantage of the inventive apparatus is that a rotating frequency generator could be given a small diameter and just a small number of pairs of poles, which implies small dimensions and makes it possible to use strong magnets. As a result, the possibilities of contactless detection of signal changes through a tight barrier, such as the wall of a measuring chamber, have been improved to a considerable extent. At the same time, a high resolution of the signal forwarded to the counter of the pump unit has been obtained by an analog signal being detected and by signal changes having a higher frequency being produced when detecting predetermined edge trigger levels.

The invention is not limited to the illustrated embodiment and may be accomplished also with, for instance, other analog signals, such as light. Consequently, also other types of apparatus for transmitting and detecting amplitude changes in analog signals may be employed.

What is claimed is:

1. An apparatus for generating signal changes when determining an amount of fuel dispensed from a fuel pump unit, comprising:

a frequency generator having a circumference and a plurality of poles on the circumference, the frequency generator which is adapted to generate a periodic signal having a frequency emitted in dependence on a volume flow of the fuel and from the plurality of poles on only the circumference of the frequency generator; and a pulse-generating device adjacent to the plurality of poles and includes at least analog sensor and at least signal processing unit, the pulse generating device which is adapted to detect the signal from the frequency generator and to emit at least one signal in dependence on the frequency, wherein the frequency generator is adapted to emit an analog signal, the at least one analog sensor for detecting an amplitude of the analog signal and the at least one signal-processing unit is adapted to compare an amplitude of the analog signal with a number of predetermined amplitude values, and to perform a signal change when a predetermined amplitude value has been reached to generate, based on the amplitude of the analog signal, signal changes having a frequency, which is dependent on and higher than the frequency of the analog signal.

2. The apparatus of claim 1, wherein the pulse-generating device includes at least two analog sensors which are adapted to detect the analog signal with a relative phase shift in relation to a quarter period.

3. The apparatus of claim 2, wherein the frequency generator includes a frequency disc having a circumference, the frequency disc which is adapted to rotate in dependence on the fuel volume flow, and the at least two analog sensors being arranged at the circumference of the frequency disc, at a relative distance in a direction of rotation of the frequency disc.

4. The apparatus of claim 3, wherein the frequency disc includes a plurality of pairs of poles for generating, during rotation, the analog signal, each pair of poles having an extension along the circumference of the frequency disc, and the relative distance between the analog sensors in the direction of rotation of the frequency disc being approximately one quarter of the extension of each of the pairs of poles.

5. The apparatus of claim 3, wherein the circumference of the frequency disc includes a number of magnets.

6. The apparatus of claim 2, wherein the signal-processing unit is adapted to control detection of the analog signal such that the signal change during a period are based on detection of a first analog sensor and during an intermediate period are based on detection of the second analog sensor, that one of the two sensors which senses a greatest absolute derivative being used during each period.

7. A method of generating signal changes when determining an amount of fuel dispensed from a fuel pump unit, comprising the steps of:

generating a periodic analog signal having a frequency corresponding to a fuel volume flow in the pump unit and emitted from a plurality of poles at only a circumference of a frequency generator;

detecting an amplitude of the analog signal;

comparing the amplitude of the analog signal with a plurality of predetermined amplitude values; and effecting a signal change when at least one of the plurality of predetermined amplitude values has been reached for emitting, based on the amplitude of the analog signal, signal change having a frequency which is dependent on and higher than the frequency of the periodic analog signal.

8. The method of claim 1, wherein the detecting of the amplitude of the analog signal includes simultaneously detecting a first phase angle position and a second phase angle position, which are phase-shafted relative to each other.

9. The method of claim 8, wherein detecting a first phase angle position and a second phase angle position includes phase shifting the first phase angle position and the second phase angle position relative to each other by about a quarter of a period.

10. The method of claim 8, wherein the effecting the signal change is alternatingly based on detection of the amplitude of the analog signal in the first phase angle position and in the second phase angle position.

11. The method of claim 10, wherein the effecting the signal change occasionally detecting is based on detection of the amplitude of the analog signal in that phase angle position of the first phase angle position and the second phase angle position where the analog signal has a greatest absolute derivative.

12. The method of claim 11, wherein the detection of the analog signal includes detecting the analog signal with a periodically varying magnetic field.

13. The method of claim 12, wherein the effecting the signal change includes detecting a frequency of the signal change 16 times higher than the frequency of the analog signal.

* * * * *

UNITED STATES PATENT AND TRADEMARK OFFICE
CERTIFICATE OF CORRECTION

PATENT NO. : 6,363,795 B1
DATED : April 2, 2002
INVENTOR(S) : Bergqvist et al.

It is certified that error appears in the above-identified patent and that said Letters Patent is hereby corrected as shown below:

Column 1,
Line 44, reads "chamber depending on the of pulses emitted by the pulse" please replace as follows: -- chamber depending on the number of pulses emitted by the pulse --
Line 58, a period should go behind the word "disc" as it is the end of a sentence -- disc. --

Column 4,
Line 57, in the sentence, "The phase angle position a of the --" please replace as follows: -- The phase angle position α of the --

Columns 5, 17 and 24,
The equation $U_{1-U4}$ should be replaced to correctly reflect: Please replace as follows: -- $U_1 - U_4$ --

Signed and Sealed this

Eleventh Day of June, 2002

Attest:

Attesting Officer

JAMES E. ROGAN
Director of the United States Patent and Trademark Office